Patented Aug. 23, 1932

1,873,925

UNITED STATES PATENT OFFICE

KARL WILKE, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

BENZANTHRONE DERIVATIVES OF PYRAZOLANTHRONE AND PROCESS OF PREPARING THEM

No Drawing. Application filed March 22, 1929, Serial No. 349,265, and in Germany September 24, 1926.

The present invention relates to benzanthrone derivatives of pyrazolanthrone and process of preparing them; it contains subject matter in common with my co-pending U. S. patent application Serial No. 216,338 filed on August 29, 1927.

I have found that by heating of a pyrazolanthrone of the following general formula:

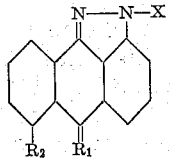

wherein
X stands for hydrogen or a metal,
$R_1$ for oxygen,
$R_2$ for hydrogen or
$R_1$ and $R_2$ together stand for

and wherein the nuclear-hydrogen atoms of the pyrazolanthrone radical may be substituted or not by any univalent residues, as, for instance, the nitro group, an alkyl group and the like, with a halogen-benzanthrone, new compounds are obtained which are of great value in the manufacture of dyestuffs. The reaction is preferably carried out in an organic solvent with the addition of any of the known agents capable of promoting the splitting off of halogen hydracid, of a catalyst such as copper powder, copper salts, vanadium salts or the like and of an acid binding agent, such as potassium carbonate, potassium acetate or the like.

The new products, thus obtained, have the following probable formula:

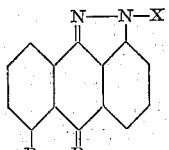

wherein
X stands for a substituted or unsubstituted benzanthrone radical,
$R_1$ for oxygen,
$R_2$ for hydrogen or
$R_1$ and $R_2$ together stand for

and wherein the nuclear-hydrogen atoms of the pyrazolanthrone radical may be substituted or not by any univalent residue as for instance the nitro group, an alkyl group or the like.

The following examples serve to illustrate my invention, but they are not intended to limit it thereto, the parts being by weight.

(1) 22 parts of pyrazolanthrone and 15 parts of potassium carbonate are introduced at first at ordinary temperature, while stirring, into 250 parts of nitrobenzene whereby a thick almost colorless magma is produced. The mixture is then heated to boiling for some time in an oil bath, while stirring, until a homogeneous red salt of the pyrazolanthrone has been formed. After adding 35 parts of Bz-1-bromobenzanthrone and about one part of copper carbonate, the mass is stirred for another 10 hours at boiling heat. The benzanthronyl-pyrazolanthrone which crystallizes out on cooling and which may be represented by the following formula:

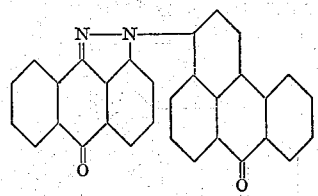

is filtered, washed with nitrobenzene, alcohol and water and dried. This compound is a yellow crystalline powder which, when recrystallized from nitrobenzene, melts at 398° C. to 400° C. It dissolves in concentrated sulfuric acid to a yellowish-red solution without any fluorescence.

The condensation may also be carried out in the following manner: 7 parts of potassium carbonate are finely ground in a ball mill with 150 parts of nitrobenzene. Thereupon the mixture is poured into a stirring apparatus together with 100 parts of nitrobenzene and, after addition of 22 parts of pyrazolanthrone as above described, the mass is heated until the potassium salt has been formed. Then 31 parts of bromobenzanthrone are added and the further treatment is carried as above described.

(2) To a paste of the potassium salt of pyrazolanthrone, prepared according to Example 1 by heating 66 parts of pyrazolanthrone and 66 parts of potassium carbonate in 750 parts of nitrobenzene, are added 103 parts of Bz-1-chloro-Bz-2-phenylbenzanthrone of the melting point 248° C. and the mixture is stirred at boiling heat for 8 to 10 hours. After cooling, the mass is filtered and washed with nitrobenzene, alcohol and water and then dried. The Bz-2-phenyl-benzanthronyl-pyrazolanthrone, thus prepared, has the formula

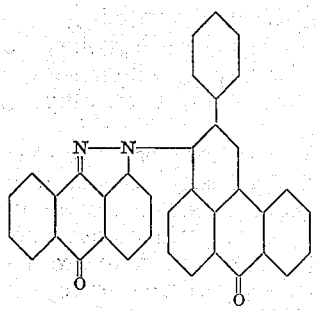

and forms a yellow crystalline powder, which can be recrystallized from a large quantity of pyridine. When in a pure state, it dissolves in concentrated sulfuric acid to a yellowish-red solution without any fluorescence.

(3) If for the pyrazolanthrone used in Example 1 are substituted 23.5 parts of 4-methylpyrazolanthrone (comp. Berichte der deutschen Chemischen Gesellschaft, vol. 55, page 2162) and otherwise the procedure as set forth in Example 1 is followed, the benzanthronyl-4-methylpyrazolanthrone of the formula:

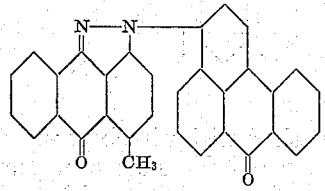

is obtained, which, when recrystallized from nitrobenzene, forms a brownish-yellow powder melting at 332° C. to 333° C. In concentrated sulfuric acid the product dissolves to a brownish-red solution without any fluorescence.

(4) If for the bromobenzanthrone as used in Example 1 there are substituted 35.5 parts of nitrated Bz-1-bromobenzanthrone which has its melting point at 292° C. (comp. U. S. patent application, filed June 21, 1926 under Serial No. 117,568), a nitrobenzanthronyl-pyrazolanthrone of the formula:

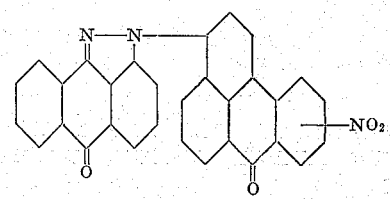

is produced. This compound forms a reddish-yellow powder which, on recrystallization from a large quantity of nitrobenzene, melts at 404° C. to 405° C. It dissolves in concentrated sulfuric acid to a reddish-yellow solution with no fluorescence.

By reducing this nitro body, for instance by means of stannous chloride in a mixture of glacial acetic acid and hydrochloric acid a red aminobenzanthronyl-pyrazolanthrone is formed which melts at 417° C. and is soluble in concentrated sulfuric acid with a reddish-yellow color.

(5) By condensing 232 parts of dipyrazolanthrone (comp. Berichte der deutschen Chemischen Gesellschaft, vol. 45, page 2246) or corresponding parts of the dipotassium salt of this compound with 620 parts of Bz-1-bromobenzanthrone according to the method indicated in Example 1, there is easily obtained a dibenzanthronyl-dipyrazolanthrone of the formula:

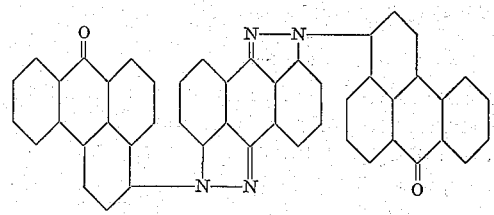

This body can be recrystallized from a large quantity of nitrobenzene. It then forms an orange-brown crystalline powder which, even when heated up to 450° C., does not melt. In concentrated sulfuric acid it dissolves to a reddish-yellow solution.

(6) 22 parts of pyrazolanthrone, 22 parts of potassium acetate, 31 parts of Bz-1-bromobenzanthrone and one part of copper acetate are boiled in the reflux condenser for about 8 hours, while stirring, in 250 parts of nitrobenzene. After cooling. the mass is filtered, washed first with nitrobenzene and then with alcohol and water and dried. The resulting product is identical with that obtained according to Example 1.

(7) If the Bz-1-bromobenzanthrone used in Example 1 and Example 6 respectively is replaced by 26.5 parts of 2-chloro-benzanthrone there is likewise obtained in an easy manner and with a good yield the isomeric 2-benzanthronyl-Py-1-pyrazolanthrone of the formula:

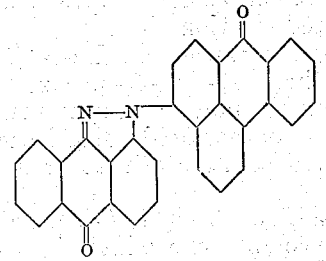

It forms a yellow crystalline powder which melts at 398° C. to 400° C. and dissolves in concentrated sulfuric acid to a yellowish-red solution. When mixed with the similar Bz-1-benzanthronyl-Py-1-pyrazolanthrone obtained in Examples 1 and 6, the degree of the melting point is considerably lowered.

I claim:

1. The process which comprises heating a pyrazolanthrone of the following general formula:

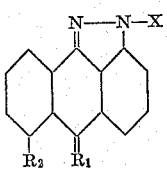

wherein
X stands for hydrogen or a metal,
$R_1$ for oxygen,
$R_2$ for hydrogen or
$R_1$ and $R_2$ together stand for

with a halogen-benzanthrone preferably in the presence of a catalyst capable of promoting the splitting off of hydrogen halide and also in the presence of an inert organic solvent and an acid-binding agent.

2. The process which comprises heating to boiling a pyrazolanthrone of the following general formula:

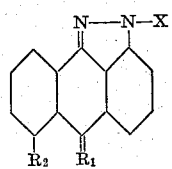

wherein
X stands for hydrogen or a metal,
$R_1$ for oxygen,
$R_2$ for hydrogen or
$R_1$ and $R_2$ together stand for

with a halogen-benzanthrone preferably in the presence of a copper catalyst and also in the presence of nitrobenzene and potassium carbonate.

3. The process which comprises heating a pyrazolanthrone of the following formula:

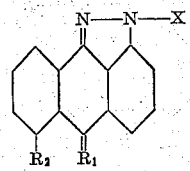

wherein
X stands for a potassium atom,
$R_1$ for oxygen,
$R_2$ for hydrogen or
$R_1$ and $R_2$ together stand for

with a halogen-benzanthrone preferably in the presence of a catalyst capable of promoting the splitting off of hydrogen halide and also in the presence of an inert organic solvent and an acid binding-agent.

4. The process which comprises heating to boiling a pyrazolanthrone of the following formula:

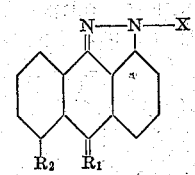

wherein
X stands for a potassium atom,
$R_1$ for oxygen,
$R_2$ for hydrogen or
$R_1$ and $R_2$ together stand for

with a halogen-benzanthrone preferably in the presence of a copper catalyst and also in the presence of nitrobenzene and potassium carbonate.

5. The process which comprises heating a pyrazolanthrone of the following formula:

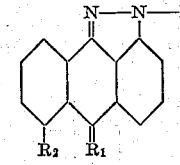

wherein
X stands for a potassium atom,
$R_1$ for oxygen,
$R_2$ for hydrogen or
$R_1$ and $R_2$ together stand for

with a Bz-1-halogen-benzanthrone preferably in the presence of a catalyst capable of promoting the splitting off of hydrogen halide and also in the presence of an inert organic solvent and an acid-binding agent.

6. The process which comprises heating to boiling a pyrazolanthrone of the following formula:

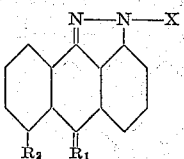

wherein
X stands for a potassium atom,
R₁ for oxygen,
R₂ for hydrogen or
R₁ and R₂ together stand for

with a Bz-1-halogen-benzanthrone preferably in the presence of a copper catalyst and also in the presence of nitrobenzene and potassium carbonate.

7. The process which comprises heating to boiling the potassium salt of pyrazolanthrone with Bz-1-bromo-benzanthrone in the presence of copper carbonate, nitrobenzene and potassium carbonate.

8. As new products, compounds of the following general formula:

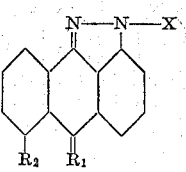

wherein
X stands for a benzanthrone radical,
R₁ for oxygen,
R₂ for hydrogen or
R₁ and R₂ together stand for

9. As new products, compounds of the following formula:

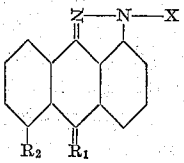

wherein
X stands for

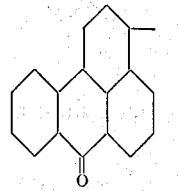

bound in Bz-1-position,
R₁ for oxygen,
R₂ for hydrogen or
R₁ and R₂ together stand for

10. As a new product, Bz-1-benzanthronyl-Py-1-pyrazolanthrone which crystallizes from nitrobenzene in the form of a yellowish powder melting at from 398° C. to 400° C., dissolving in concentrated sulfuric acid to a yellowish-red solution.

11. As a new product, Bz-1-(Bz-2-phenylbenzanthronyl)-Py-1-pyrazolanthrone which forms a yellow crystalline powder and dissolves in concentrated sulfuric acid to a yellowish-red solution without any fluorescence.

12. As a new product, 2-benzanthronyl-Py-1-pyranzolanthrone which forms a yellow crystalline powder melting at 398° C. to 400° C. and dissolving in concentrated sulfuric acid to a yellowish-red solution.

In testimony whereof, I affix my signature.
KARL WILKE.